US008523634B2

(12) United States Patent
Woelfel

(10) Patent No.: US 8,523,634 B2
(45) Date of Patent: Sep. 3, 2013

(54) METHOD FOR THE GRINDING OF A PROFILE OF A WORKPIECE

(75) Inventor: Friedrich Woelfel, Coburg (DE)

(73) Assignees: Kapp GmbH, Coburg (DE); Niles Werkzeugmaschinen GmbH, Berlin (DE)

( * ) Notice: Subject to any disclaimer, the term of this patent is extended or adjusted under 35 U.S.C. 154(b) by 376 days.

(21) Appl. No.: 13/011,360

(22) Filed: Jan. 21, 2011

(65) Prior Publication Data

US 2011/0183585 A1 Jul. 28, 2011

(30) Foreign Application Priority Data

Jan. 23, 2010 (DE) ......................... 10 2010 005 435

(51) Int. Cl.
*B24B 1/00* (2006.01)

(52) U.S. Cl.
USPC ................. 451/47; 409/73; 409/78; 409/192; 409/201; 409/229; 451/48; 451/58; 451/65; 451/132; 451/147; 451/195; 451/253

(58) Field of Classification Search
USPC ............. 409/66, 73, 75, 76, 77, 78, 192, 201, 409/229; 451/47, 48, 57, 58, 65, 120, 124, 451/132, 133, 134, 147, 161, 195, 209, 253, 451/275, 219, 900
See application file for complete search history.

(56) References Cited

U.S. PATENT DOCUMENTS

| | | | | |
|---|---|---|---|---|
| 3,579,315 | A * | 5/1971 | Hufendick | 451/48 |
| 8,313,357 | B2 * | 11/2012 | Heyder | 451/10 |
| 2004/0040133 | A1 | 3/2004 | Ronneberger | |
| 2009/0227182 | A1 * | 9/2009 | Breith et al. | 451/5 |

FOREIGN PATENT DOCUMENTS

| | | | |
|---|---|---|---|
| DE | 44 31 374 | A1 | 3/1996 |
| DE | 10 2008 035 525 | B3 | 12/2009 |

* cited by examiner

*Primary Examiner* — Timothy V Eley
(74) *Attorney, Agent, or Firm* — Lucas & Mercanti, LLP

(57) ABSTRACT

The invention relates to a method for the grinding of a profile (1) of a workpiece (2) with a gear or profile grinding machine (3), wherein the profile (1) which has to be ground is successively at first ground during a roughing operation with a roughing grinding tool (4) and is afterwards ground during a finishing operation with a finishing grinding tool (5), wherein a stock of the profile (1) which has to be removed is ground by the roughing and the finishing operation, wherein the roughing grinding tool (4) and the finishing grinding tool (5) are arranged coaxially on a common tool spindle (6) or on two separate tool spindles and wherein a translational movement is created between the grinding tools (4, 5) and the workpiece (2) in a direction of a first axis (x) for carrying out a grinding stroke. To improve the cost effectiveness and the quality of the grinding process the invention is characterized in that the at least one tool spindle (6) or the workpiece (2) is swiveled around an axis (A) of rotation which is directed in the direction of the first axis (x) by a predetermined angle (α) during the execution of the roughing operation or the finishing operation from a basic position (I) into a swivel position (II) in such a way that the grinding tool (5) which is not in operation can be passed over the profile (1) to be machined without collision.

12 Claims, 4 Drawing Sheets

METHOD FOR THE GRINDING OF A PROFILE OF A WORKPIECE

Figure 1:
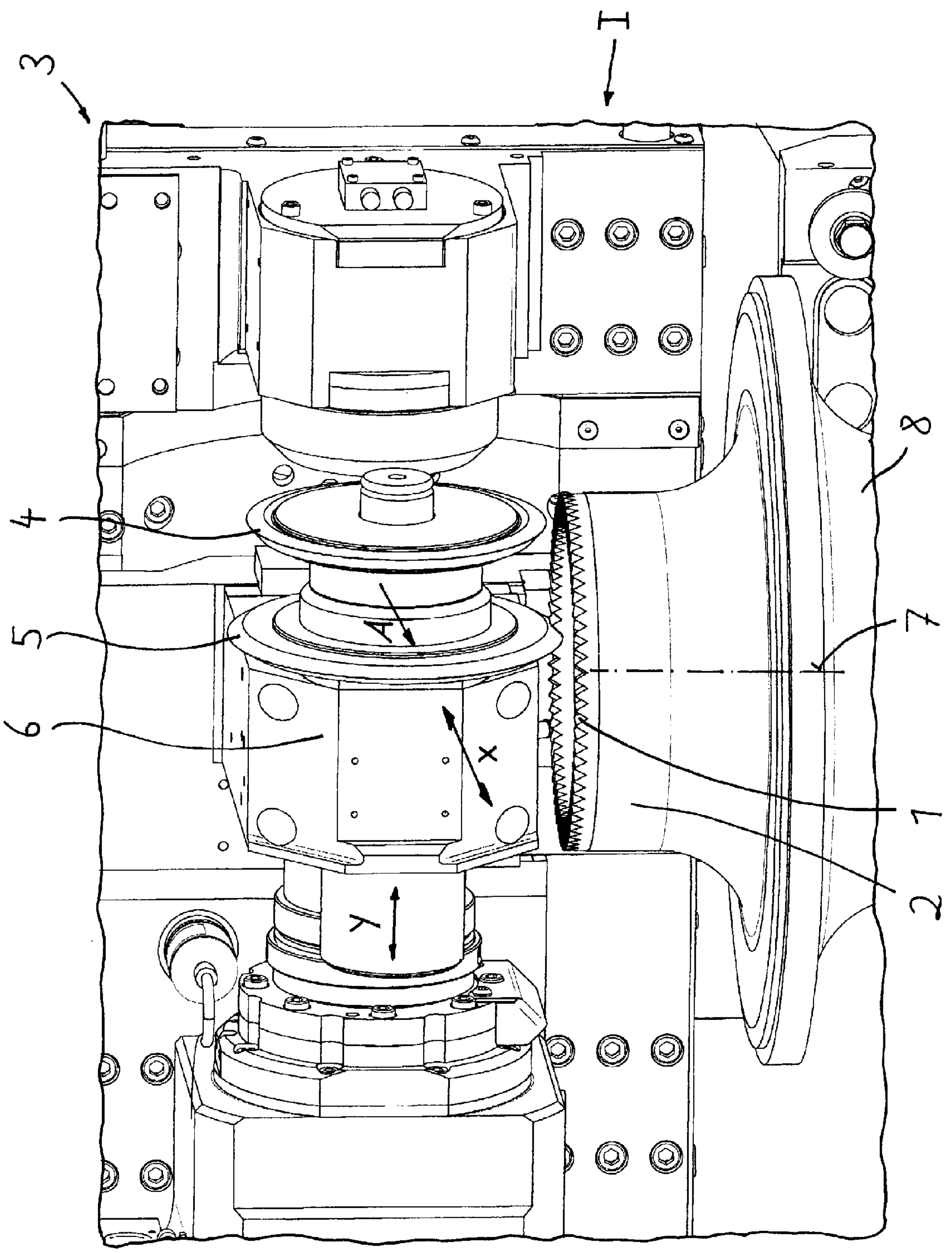

This application claims the priority of German application DE 10 2010 005 435.6 filed Jan. 23, 2010, the content of which is incorporated by reference herein.

The invention relates to a method for the grinding of a profile of a workpiece, especially of a gearing, with a gear or profile grinding machine, wherein the profile which has to be ground is successively at first ground during a roughing operation with a roughing grinding tool and is afterwards ground during a finishing operation with a finishing grinding tool, wherein a stock of the profile which has to be removed is ground by the roughing and the finishing operation, wherein the roughing grinding tool and the finishing grinding tool are arranged coaxially on a common tool spindle or on two separate tool spindles and wherein a translational movement is created between the grinding tools and the workpiece in a direction of a first axis for carrying out a grinding stroke.

Especially in the production of gears the final hard finishing process has a major relevance. During this process the flanks of the tooth are machined by a grinding operation to bring them to the exact contour. An effective method for the production of a gear is the generative grinding by means of a grinding worm or the profile grinding with a profile grinding disk.

The precise forming takes place preferably by a two-step grinding process in a profile or gear grinding machine. According to this process a major part of the stock which has to be removed is machined by a first working step (roughing). In a subsequent further grinding step (finishing) the final contour of the profile is produced, wherein here only the remainder of the stock is ground. Hereby, for the rough grinding and for the finish grinding for example profile grinding disks are used which form the profile by guidance of the grinding tool through the profile gap of the workpiece. The well known partition of the grinding process into roughing and finishing enhances the cost effectiveness of the method significantly.

When a classical spur gear is ground, i. e. a gear which has the gearing at the cylindrical outer circumference of the gear base body, the situation is mostly problem-free. The roughing grinding disk and the finishing grinding disk are arranged on a tool spindle, e. g. distanced by a distance piece. By a linear shift movement in axial direction of the tool spindle the roughing grinding disk or the finishing grinding disk can be brought into engagement alternatively; for doing so a linear NC shift axis is used. It is aimed due to economical reasons and also due to reasons concerning the quality of the operation that only a short-stroke shift movement takes place. This can be obtained by the fact that the roughing grinding disk during finishing and the finishing grinding disk during roughing respectively passes an adjacent tooth gap contactless (so-called "gap drive"). In this case, the change between roughing and finishing takes place with a relatively small shift movement of the tool spindle.

Another situation is given when a gearing must be ground which is arranged at a face side of a cylindrical gear base body. An example for this is the so-called serration. As during the execution of a grinding stroke by which the grinding disk is driven through a tooth gap no parallel adjacent tooth gap exists, a "gap drive" cannot be carried out.

A combined roughing and finishing becomes possible by the fact that the axial distance between the roughing grinding disk and the finishing grinding disk is chosen bigly so that the grinding disk which is not used is arranged during operation in a sufficient distance to the used grinding disk and consequently does not collide with the workpiece. Alternatively, also an automatic tool change between the roughing grinding tool and the finishing grinding tool can be carried out so that different tools are engaged subsequently and separately.

At first, both possibilities have negative economical consequences. A long shift movement requires non-productive times which reduce the cost effectiveness of the grinding process. Also, the change of tools causes time what also reduces the cost effectiveness.

On the other hand the precision of the grinding process can suffer by the mentioned actions.

It is an object of the invention to further develop a method of the above mentioned kind which allows that the existing drawbacks can be avoided when grinding a face gearing. Accordingly, it should become possible to work with a small shift movement between roughing and finishing Furthermore, it should become possible to do without costly tool changes between roughing and finishing grinding tools.

According to the invention, the solution of this object is characterized in that the at least one tool spindle (or in kinematic reversion the workpiece) is swiveled around an axis of rotation which is directed in the direction of the first axis by a predetermined angle during the execution of the roughing operation or the finishing operation from a basic position into a swivel position in such a way that the grinding tool which is not in operation can be passed over the profile to be machined without collision.

The mentioned basis position needs not necessarily to be a "zero position" of the axis.

Preferably, the at least one tool spindle (or the workpiece) is hereby concretely swiveled during the execution of the roughing operation by the predetermined angle into the swivel position and is used during the execution of the finishing operation in the non-swiveled basic position.

Specifically preferred it is provided that a roughing grinding tool and a finishing grinding tool are used which have different effective outer diameters. Hereby it is specifically approved that the effective outer diameter of the grinding tool which has the bigger diameter is between 105% and 130% of the effective outer diameter of the grinding tool which has the smaller diameter.

The predetermined angle is mostly between 5° and 25°, specifically preferred between 10° and 20°.

The workpiece to be machined has mostly an axis of rotation and at least one gearing; the gearing is arranged at a face side of the workpiece for an especially advantageous use of the proposed manufacturing method.

At least one of the grinding tools, preferably both grinding tools, are preferably profile grinding wheels. Furthermore, at least one of the grinding tools, preferably both grinding tools, are preferably non-dressable grinding tools.

With the proposed manufacturing method it becomes possible to accomplish the change between the roughing grinding tool and the finishing grinding tool by a short shift movement what can be carried out in a respective short time The swiveling of the tool spindle around the mentioned axis can be carried out very quickly so that in total a very short non-productive time becomes possible beside the actual grinding time. So, the cost effectiveness of the grinding method can be improved.

Furthermore, the quality of the grinding operation is high, because long traveling distances and a tool change between roughing and finishing grinding tools can be avoided.

So, namely face gearings (especially serrations and similar gearings) can be hard finished economically and precisely.

In the drawing an embodiment of the invention is depicted.

Figure 2:
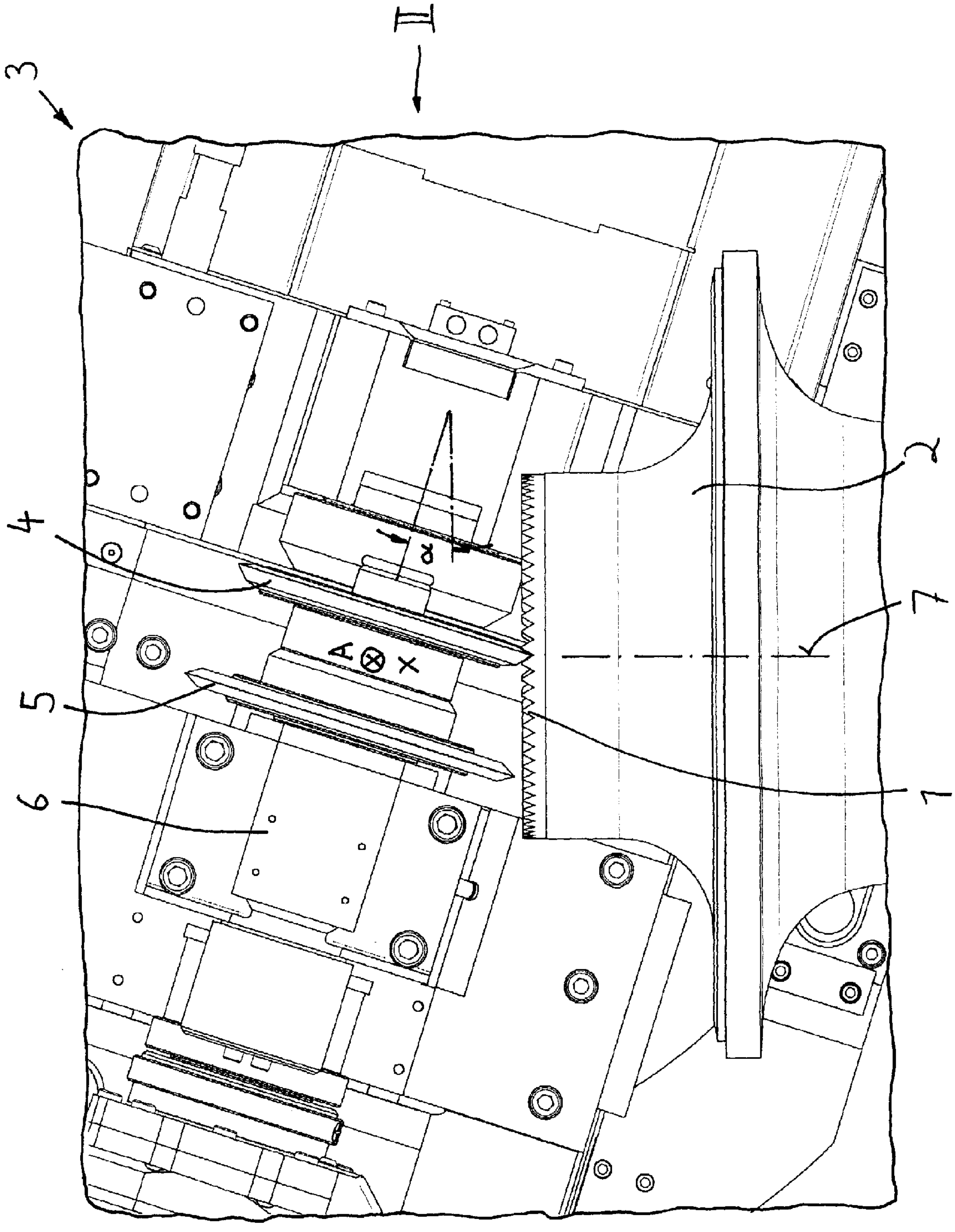
Figure 3:
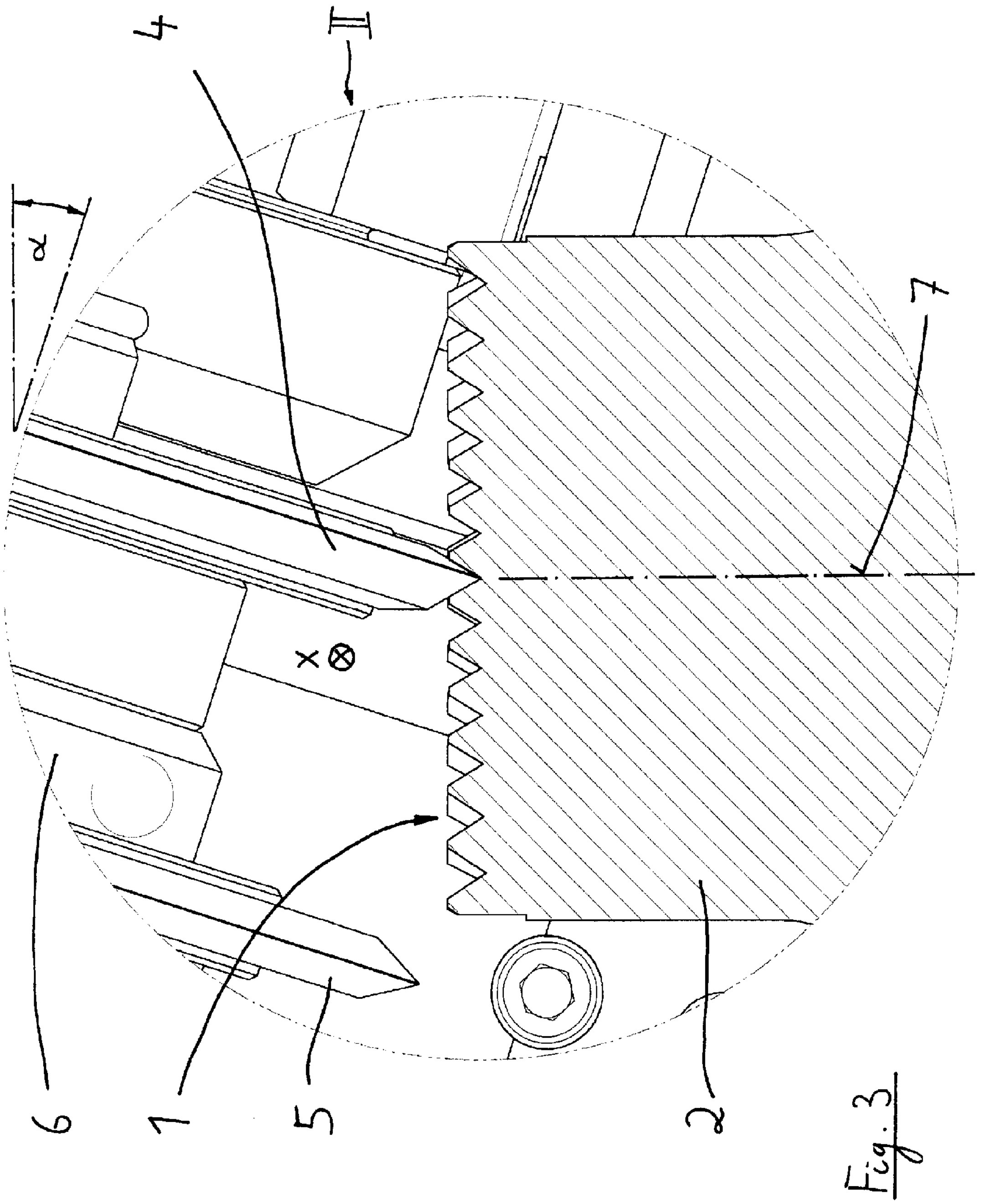
Figure 4:
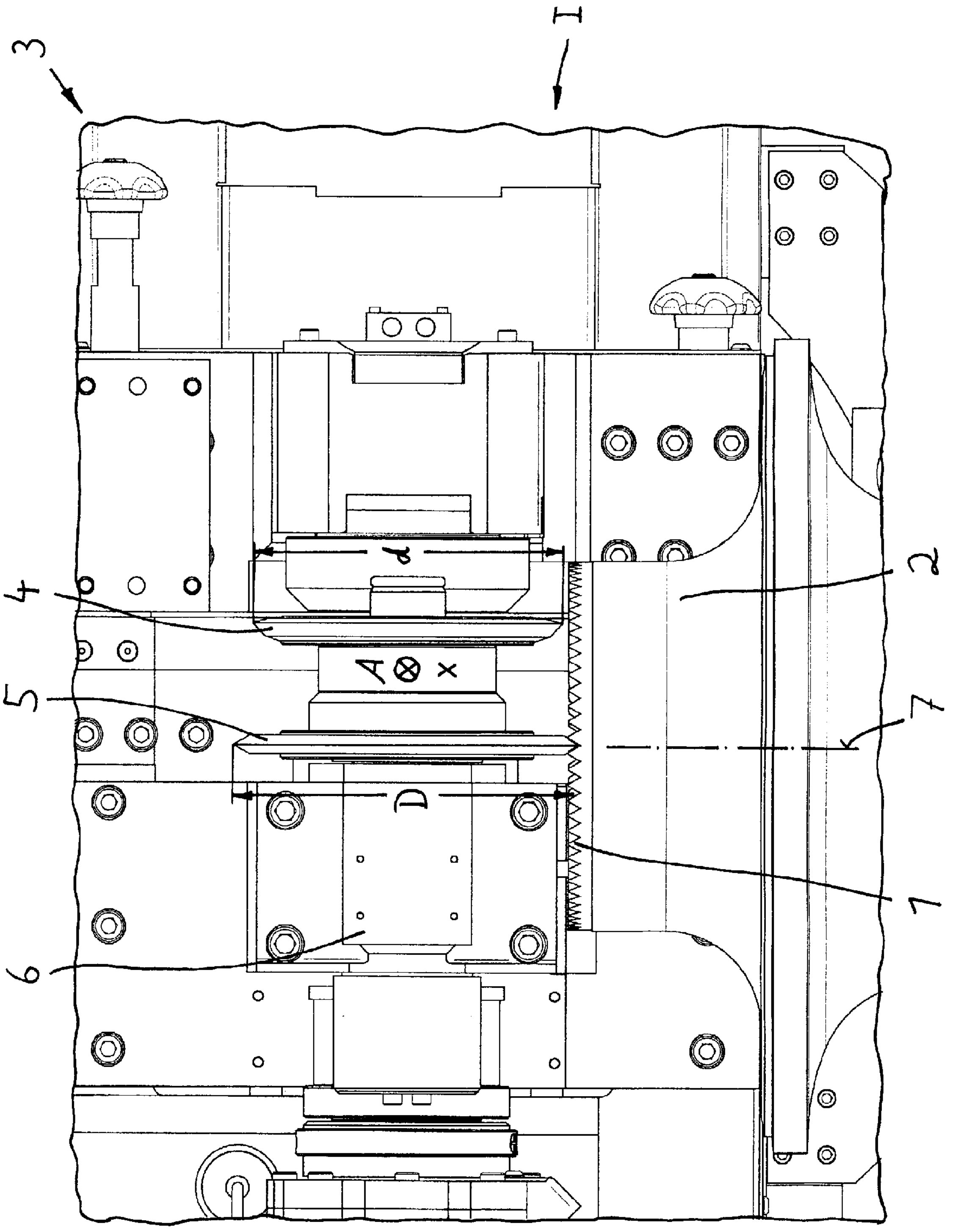

FIG. 1 shows in a perspective view a detail of a gear grinding machine, in which a workpiece is machined with a roughing grinding disk and a finishing grinding disk, FIG. 2 the front view of the gear grinding machine according to FIG. 1 during the roughing grinding process, FIG. 3 an enlarged depiction of the region of engagement of the tool into the gearing of the workpiece during the roughing grinding process and FIG. 4 the front view of the gear grinding machine according to FIG. 1 during the finishing grinding process.

In FIG. 1 a gear grinding machine 3 is shown by which a workpiece having a gearing 1 can be hard machined, i. e. ground. The gearing 1 is a so-called serration, i. e. the workpiece 2 has a base body with an axis of rotation 7, wherein the gearing 1 is arranged at a face end of the base body, what can be seen from FIG. 1.

The gear grinding machine 3 is equipped in a manner as usually known. The workpiece 2 is arranged on a workpiece spindle 8, wherein presently the axis of the workpiece spindle 8 is oriented vertically (it is concentrical with the axis of rotation 7 of the workpiece 2).

The grinding of the gearing 1 takes place with a tool combination consisting of a roughing grinding tool 4 and a finishing grinding tool 5, which are both arranged on a tool spindle 6 and are rotationally driven. Thereby, the tool spindle 6 can be moved in the direction of a shift axis y for alternatively bringing the roughing grinding tool 4 or the finishing grinding tool 5 into engagement with the gearing 1.

Furthermore, the whole tool spindle 6 can execute a translational movement into the direction of the axis x as depicted. This serves for driving the grinding tool 5 or 6 through a tooth gap after positioning of the same and to grind a stock from a tooth flank as commonly known. Furthermore, the whole tool spindle 6 is also pivotable around an axis A. This axis A is arranged parallel to the axis x. Normally, the axis A is required to adjust the grinding tool to the helix angle of a gear with an outer helical gearing.

In FIG. 4 the front view of the grinding machine 3 is depicted, corresponding to the grinding machine according FIG. 1. In this figure is can be well seen that the finishing grinding tool 5 has a bigger outer diameter D than the roughing grinding tool 6 which has an outer diameter d.

For the grinding of the gearing 1 the following process is carried out. As commonly known a partition of the removal of the stock of a tooth flank is done in a roughing working step with the roughing grinding tool 4 and in a finishing working step with the finishing grinding tool 5.

The roughing grinding process is shown in FIGS. 2 and 3. It is essential that the tool spindle 6 is swiveled around the axis of rotation A which is directed in the direction of the first axis x by a predetermined angle α during the execution of the roughing operation from a basic position I (as shown in FIGS. 1 and 4) into a swivel position II (as shown in FIGS. 2 and 3) in such a way that the grinding tool 5 which is not in operation during roughing can be passed over the profile 1 to be machined without collision. The profile of the roughing grinding tool 4 is formed accordingly, so that in spite of the swiveling by the angle α the required gearing profile is created; this can be well seen in FIG. 3.

This means that in spite of the fact that the finishing grinding tool 5 is arranged relatively close to the roughing grinding tool 4 and can be thus brought into working position with a short shift movement no collision of the finishing grinding tool 5 is given when the roughing step is carried out. It can be seen specifically in FIG. 2 that the finishing grinding tool 5 is arranged above the gearing 1 with a little clearance during the roughing step.

For finishing the tool spindle 6 is swiveled back again from the swivel position II into the basic position I according to FIG. 1 and FIG. 4 and in this position the gearing 1 is finished. As the diameter d of the roughing grinding tool 4 is chosen smaller that the diameter D of the finishing grinding tool 5 also here no collision takes place between the not used (roughing) grinding tool 4 with the workpiece 2.

Consequently, also several (here: two) tools can be brought into operation by using of a "short" shift axis, wherein collision can be avoided between the tools which are not in operation and the workpiece.

A swivel angle α with a value between 10° and 20° is proven, especially a swivel angle of 17.5°.

In the shown embodiment the grinding tool diameter of the finishing grinding tool is 185 mm, that one of the roughing grinding tool is 165 mm.

It would be also possible that the roughing and the finishing takes place with respective different swivel angles α being not zero, i. e. as already mentioned above the mentioned basic position needs not necessarily to be the "zero position" of the axis.

LIST OF REFERENCE NUMERALS

1 Profile (gearing)
2 Workpiece (with face gearing)
3 Gear or profile grinding machine
4 Roughing grinding tool
5 Finishing grinding tool
6 Tool spindle
7 Axis of rotation of the workpiece
8 Workpiece spindle
x First axis
y Shift axis
A Axis of rotation
D Outer diameter of the finishing grinding tool
d Outer diameter of the roughing grinding tool
α Angle
I Basic position
II Swivel position

The invention claimed is:

1. Method for the grinding of a profile of a workpiece with a profile grinding machine, comprising:

rough grinding the profile which has to be ground with a roughing grinding tool, and finish grinding the rough ground profile with a finishing grinding tool, wherein a stock of the profile which has to be removed is ground successively by the rough and the finish grinding, wherein the roughing grinding tool and the finishing grinding tool are located on an at least one tool spindle either arranged coaxially on a common tool spindle or on two separate tool spindles, wherein a translational movement is created between the grinding tools and the workpiece in a direction of a first axis (x) for carrying out a grinding stroke, wherein the at least one tool spindle or the workpiece is swiveled around an axis (A) of rotation which is directed in the direction of the first axis (x) by a predetermined angle (α) during the execution of the rough grinding or the finish grinding from a basic position (I) into a swivel position (II) in such a way that the grinding tool which is not grinding does not come into contact with the workpiece.

2. Method according to claim 1, wherein the at least one tool spindle or the workpiece is swiveled during the rough grinding by the predetermined angle (α) into the swivel position (II) and is used during the finish grinding in the non-swiveled basic position (I).

3. Method according to claim 1, wherein the roughing grinding tool and the finishing grinding tool have different effective outer diameters (D, d).

4. Method according to claim 3, wherein the effective outer diameter (D) of the grinding tool which has the bigger diameter is between 105% and 130% of the effective outer diameter (d) of the grinding tool which has the smaller diameter.

5. Method according to claim 1, wherein the predetermined angle (α) is between 5° and 25° .

6. Method according to claim 5, wherein the predetermined angle (α) is between 10° and 20° .

7. Method according to claim 1, wherein the workpiece to he machined has an axis of rotation and at least one gearing.

8. Method according to claim 7, wherein the gearing is arranged at a face side of the workpiece.

9. Method according to claim 1, wherein at least one of the grinding tools is a profile grinding wheel.

10. Method according to claim 1, wherein at least one of the grinding tools is a non-dressable grinding tool.

11. Method according to claim 1, wherein both grinding tools are profile grinding wheels.

12. Method according to claim 1, wherein both grinding tools are non-dressable grinding tools.

* * * * *